June 8, 1948. H. A. MULLEN 2,443,052
EJECTOR TYPE ELECTRODE HOLDER
Filed Feb. 28, 1947
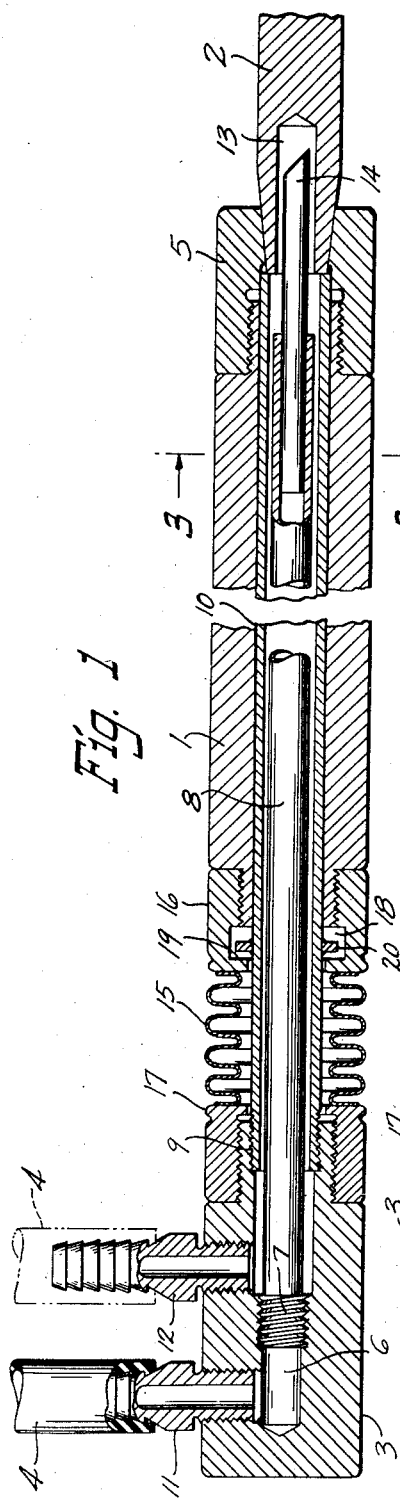
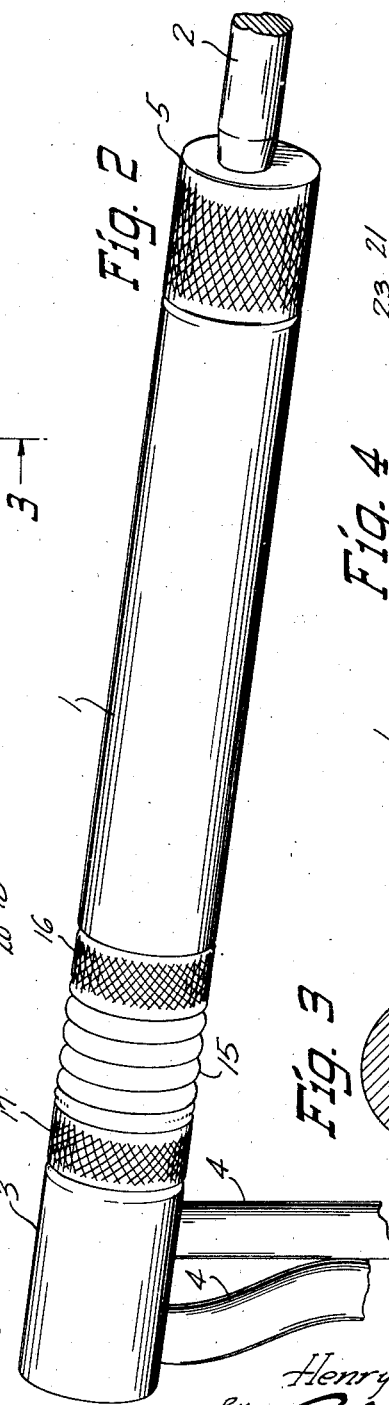
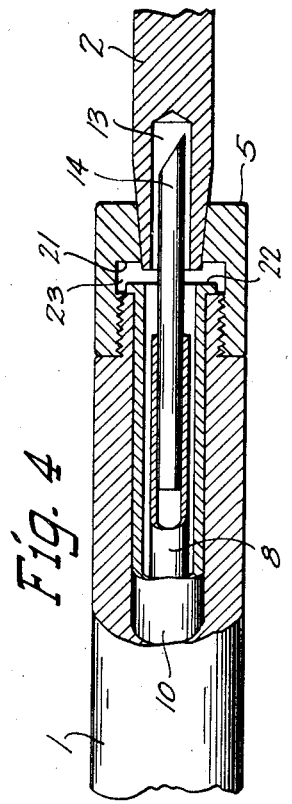
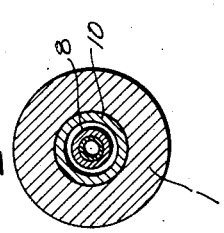
Inventor
Henry A. Mullen
By
Attorney Patented June 8, 1948

2,443,052

UNITED STATES PATENT OFFICE 2,443,052

EJECTOR TYPE ELECTRODE HOLDER

Henry A. Mullen, Milwaukee, Wis., assignor to Ampco Metal, Inc., Milwaukee, Wis., a corporation of Wisconsin Application February 28, 1947, Serial No. 731,544

8 Claims. (Cl. 219—4)

This invention relates to ejector-type electrode holders and particularly to certain types of water cooled holders.

A principal object of the invention is to provide a water cooled electrode holder of the ejector type and a construction therefor which can be positively sealed against leakage of the coolant and which will not gradually loosen or leak after being in operation.

Another object of the invention is to provide an electrode holder which will require little or no maintennace of the seal between the movable parts thereof.

Another object of the invention is to provide an electrode holder of sturdy and serviceable design which may be manufactured at low cost.

Another object is to provide an electrode holder of the water cooled, ejector-type which may be easily assembled and disassembled.

Another object is to protect the yieldable seal against overstress from internal water pressure and to retain the cooling head against such pressure.

These and other objects and advantages of the invention will become apparent from the following description of a preferred embodiment of the invention as illustrated in the accompanying drawings.

In the drawings:

Figure 1 is a longitudinal central section of the holder;

Fig. 2 is a perspective view of the holder;

Fig. 3 is a transverse section taken on line 3—3 of Fig. 1; and

Fig. 4 is a longitudinal section of the lower end of a holder showing an alternative form of construction.

The welding electrode holder as shown in the drawings, in general, comprises the tubular barrel or handle 1 which at one end supports the electrode tip 2 and at the other end is provided with the head 3 to which is connected a pair of hoses 4 for circulating water from a source, not shown, through the holder to cool and protect the tip from high welding temperatures.

The barrel 1 is of tubular metal construction and electrode tip 2 may be inserted directly into the end of the barrel or, as shown in the drawings, barrel extension 5 may be threaded onto the lower end of barrel 1 and which in turn has a tapered opening into which the tapered end of tip 2 is tightly fitted.

The head 3 is generally cylindrical and has a bore or chamber 6 extending axially thereof and which is closed at the upper end. The bore or chamber 6 is of smaller diameter at its inner upper end and a threaded connection 7 is provided at the shoulder between the two diameters for securing the inner cooling tube 8 thereto, and thereby separating the bore into two longitudinal sections.

A threaded connection 9 is provided in the outer lower end of bore 6 for a push member or sleeve 10 which extends concentric with tube 8 and is spaced radially therefrom.

The upper end of bore 6 is connected to the intake hose 4 by a nipple 11 threaded radially through the wall of head 3 above connection 7 to supply cooling water to tube 8.

The lower end of bore 6 is connected to the discharge hose 4 by a nipple 12 threaded radially through the wall of head 3 below connection 7 and above connection 9 to drain water from between tube 8 and sleeve 10.

The tube 8 extends axially of barrel 1 and downwardly into the bore 13 of tip 2 by means of a telescoping extension 14 which fits into tube 8 and constitutes the lower discharge end of tube 8 to discharge the coolant water directly into thermal contact with the tip. The extension 14 has a beveled lower end to provide a lateral discharge therefor in the event the lower end of the extension engages the bottom of bore 13 of tip 2.

The sleeve 10 extends downwardly in barrel 1, to contact at its lower end the upper end of tip 2 for the purpose of providing a means of tapping the tip loose in its tapered fitting by a hammer blow on the upper end of head 3.

The flexible seal which seals the joint between head 3 and barrel 1 to prevent leakage of water therebetween comprises a flexible bellows 15 of metal or other suitable material which joins the spaced ends of barrel 1 and head 3 and encircles sleeve 10 to completely enclose the joint therebetween allowing a limited relative axial movement of barrel 1 and head 3.

Bellows 15 is secured in place around sleeve 10 by circular fittings 16 and 17 which are joined to its opposite ends by means suitable to provide a water-tight joint therebetween, and threaded onto the adjacent ends of barrel 1 and head 3, respectively. Fitting 16 secures bellows 15 to barrel 1 and has an annular recess 18 on the inside thereof which provides a shoulder 19 within fitting 16 adjacent bellows 15. The collar 20 is brazed or otherwise secured to the circumference of sleeve 10 within annular recess 18 and engages shoulder 19 to prevent axial separation of barrel 1 and head 3 beyond a predetermined limit, to protect bellows 15 from undue flexing and strain, should the pressure of the water in the holder tend to force head 3 upwardly from the holder.

The electrode tip 2 may be ejected from extension 5 by tapping the top of head 3 with a hammer. Sleeve 10 transmits the blow downwardly to tip 2 and dislodges the same from within extension 5. Sleeve 10 at the end of its ejecting stroke may engage shoulder 21 of barrel extension 5 to prevent its further movement and to protect the bellows 15 from undue strain and compression. Collar 20 may also engage the upper end of barrel 1 within fitting 16 to limit the stroke of sleeve 10.

In the modified form of construction illustrated in Fig. 4, the lower end of sleeve 10 is flanged or provided with a collar 22 which constitutes a shoulder fitting into an annular recess 23 between the end of barrel 1 and its extension 5, and which is adapted to engage the end of barrel 1 to limit upward movement of sleeve 10 and head 3 under the internal fluid pressure and to engage the end of extension 5 to limit the downward stroke of sleeve 10 in ejecting tip 2. In this manner the bellows 15 is protected from excessive strain and will retain its flexibility and operativeness for a long period of time. With the construction of Fig. 4, the employment of collar 22 eliminates the necessity of using collar 20 of the previously described embodiment.

Several extension fittings 5 may be provided with tapered holes of varying sizes to be interchangeably mounted on the holder for use with electrodes of different sizes. Fittings 5 are constructed of a stronger material than barrel 1 to reduce wear and deformation in the tapered socket for received tip 2.

The bellows provides a positive seal against any water leakage through the movable joint between the sleeve and the barrel necessitated by the ejector feature of the holder.

The bellows will stand up indefinitely due to the protective features of the device preventing any undue stress on the bellows in service.

Various embodiments of the invention may be employed within the scope of the acompanying claims.

I claim:

1. In an ejector type electrode holder of the class described having a barrel body adapted to receive and hold the electrode tip at one end and a movable head at the opposite end adapted to supply coolant fluid to the body and to apply ejector forces to means extending longitudinally of the body for ejecting the tip from the body, a fluid tight seal between the body and head comprising a cylindrical bellows secured at its opposite ends to the body and head, respectively, and adapted to flex within the limits required for the ejector movement of the head.

2. In an ejector type electrode holder of the class described having a barrel body adapted to receive and hold the electrode tip at one end and a movable head at the opposite end adapted to supply coolant fluid to the body and to apply ejector forces to means extending longitudinally of the body for ejecting the tip from the body, a fluid tight seal between the body and head comprising a cylindrical bellows secured at its opposite ends to the body and head, respectively, and adapted to flex within the limits required for the ejector movement of the head, and means interlocking the body with the means therein transmitting the ejector forces to the tip to limit the relative longitudinal movement therebetween and protect said bellows against overstressing.

3. In an ejector type electrode holder of the class described having a barrel body adapted to receive and hold the electrode tip at one end and a movable head at the opposite end adapted to supply coolant fluid to the body and to apply ejector forces to means extending longitudinally of the body for ejecting the tip from the body, a fluid tight seal between the body and head comprising a cylindrical bellows interposed axially between the same, means securing one end of said bellows to the end of the body, means securing the other end of said bellows to the end of the head, and a radial projection on said ejector forces transmitting means extending into a recess between the body and the first named bellows securing means to limit the movement of the head relative to the body in at least an outward direction an prevent overstressing of the bellows.

4. In an ejector type electrode holder of the class described having a barrel body adapted to receive and hold the electrode tip at one end and a movable head at the opposite end adapted to supply coolant fluid to the body and to apply ejector forces to means extending longitudinally of the body for ejecting the tip from the body, a fluid tight seal between the body and head comprising a cylindrical bellows interposed axially between the same, means securing one end of said bellows to the end of the body, means securing the other end of said bellows to the end of the head, and a radial projection on said ejector force transmitting means adapted to engage a shoulder end of the body and limit the movement of the head relative to the body in at least an outward direction and prevent overstressing of the bellows.

5. In an electrode holder of the class described, a tubular barrel, a fitting threaded to one end of said barrel having an opening to receive an electrode tip, a tubular ejector disposed within said barrel engaging the end of said electrode tip and projecting from the opposite end of said barrel, means connected to said ejector to circulate water through said ejector and barrel to the area of said electrode, a flexible tubular seal circumferentially joining the end of said barrel opposite said tip with said ejector, said fitting having an annular recess therein, a flange collar circumferentially joined to the inner end of said ejector and fitting within said recess and engaging the end of said barrel to limit movement of said ejector in one direction, and a shoulder portion within said fitting to engage said flange and limit movement of said ejector in another direction.

6. An ejector type water cooled electrode holder comprising a barrel to receive and hold an electrode in one end, a head disposed adjacent the opposite end of said barrel and having limited longitudinal movement relative thereto, an ejector sleeve carrying said barrel secured to said head and extending within the barrel to the end of the electrode disposed therein, a water inlet and a water outlet for said head, passages within said head and said sleeve for circulating water therethrough to cool the holder and electrode, and a fluid-tight flexible seal between said barrel and said head.

7. An ejector type water cooled electrode holder comprising a head, an ejector sleeve secured at one end to said head, a barrel spaced from said head and slidably mounted on said sleeve to carry an electrode in end to end relation with the opposite end of said ejector sleeve, and a flexible cylindrical seal encircling said sleeve and joining said barrel and said head to close the holder and accommodate relative limited axial movement of said barrel and said head and sleeve for ejection of the electrode.

8. An ejector type water cooled electrode holder comprising a head, an ejector sleeve secured at one end to said head, a barrel spaced from said head and slidably mounted on said sleeve to carry an electrode in end to end relation with the opposite end of said ejector sleeve, passages within said sleeve and said head disposed to cool the electrode and holder, inlet and outlet connections for said passages, and a flexible fluid-tight seal encircling said sleeve and joining said barrel and said head to close the holder and accommodate relative limited axial movement of said barrel and said head and sleeve for ejection of the electrode.

HENRY A. MULLEN.

REFERENCES CITED

The following references are of record in the file of this patent:

UNITED STATES PATENTS

| Number | Name | Date |
|---|---|---|
| 2,385,108 | Seeloff | Sept. 18, 1945 |